(12) United States Patent
Howell

(10) Patent No.: US 6,752,103 B1
(45) Date of Patent: Jun. 22, 2004

(54) THERMOSTATICALLY CONTROLLED, HEATED ANIMAL NURSER AND MEANS FOR SIMULATING A MOTHER'S HEARTBEAT

(76) Inventor: Fay Howell, Box 2681, Milan, NM (US) 87021

( * ) Notice: Subject to any disclaimer, the term of this patent is extended or adjusted under 35 U.S.C. 154(b) by 0 days.

(21) Appl. No.: 10/407,592

(22) Filed: Apr. 7, 2003

Related U.S. Application Data

(60) Provisional application No. 60/436,898, filed on Dec. 30, 2002.

(51) Int. Cl.$^7$ ................................................. A01K 9/00
(52) U.S. Cl. ............................................ 119/71; 119/72.5
(58) Field of Search ............................. 119/71, 174, 73, 119/707, 28.5, 72.5

(56) References Cited

U.S. PATENT DOCUMENTS

| | | | |
|---|---|---|---|
| 886,485 A | * | 5/1908 | Espy ............................ 119/71 |
| 1,558,278 A | * | 10/1925 | Phillips ........................ 383/96 |
| 2,859,731 A | * | 11/1958 | Sutton ......................... 119/174 |
| 3,037,481 A | * | 6/1962 | Kloss ............................ 119/71 |
| 3,122,130 A | | 2/1964 | Brown et al. |
| 3,888,233 A | * | 6/1975 | Ware ............................. 600/28 |
| 3,994,282 A | * | 11/1976 | Moulet ......................... 600/28 |
| 4,065,660 A | * | 12/1977 | Berard ......................... 219/535 |
| 4,204,110 A | * | 5/1980 | Smit et al. .................... 392/443 |
| 4,214,554 A | | 7/1980 | Smith, Jr. |
| 4,620,505 A | | 11/1986 | Thomson et al. |
| 4,718,876 A | * | 1/1988 | Lee .............................. 446/295 |
| 4,742,799 A | * | 5/1988 | Schlitz ........................ 119/707 |
| 4,979,923 A | * | 12/1990 | Tanaka ......................... 446/72 |
| 5,188,061 A | * | 2/1993 | Lombardi ..................... 119/71 |
| 5,436,429 A | * | 7/1995 | Cline ........................... 219/202 |
| 5,463,981 A | * | 11/1995 | Marcinko et al. ............. 119/71 |
| 5,699,920 A | | 12/1997 | Ida et al. |
| D394,334 S | | 5/1998 | Dorn et al. |
| 5,797,505 A | | 8/1998 | Kaura |
| 5,816,193 A | * | 10/1998 | Haggerty ..................... 119/71 |
| 6,019,659 A | * | 2/2000 | Walters ........................ 446/72 |
| 6,042,850 A | | 3/2000 | Ida et al. |
| 6,325,695 B1 | * | 12/2001 | Weiner ......................... 446/369 |
| D466,653 S | * | 12/2002 | East ............................. D30/121 |
| 2002/0117115 A1 | * | 8/2002 | Helwig ........................ 119/28.5 |

* cited by examiner

Primary Examiner—Peter M. Poon
Assistant Examiner—Joan M. Olszewski
(74) Attorney, Agent, or Firm—John D. Gugliotta; Olen L. York, III

(57) ABSTRACT

A heated animal nurser is provided to assist young animals in nursing and feeding, and can be for use with kittens, puppies, and similar animals.

2 Claims, 3 Drawing Sheets

THERMOSTATICALLY CONTROLLED, HEATED ANIMAL NURSER AND MEANS FOR SIMULATING A MOTHER'S HEARTBEAT

RELATED APPLICATIONS

The present invention is a Continuation of U.S. Provisional Application No. 60/436,898, filed on Dec, 30, 2002. There are no other applications pending anywhere in the world.

BACKGROUND OF THE INVENTION

1. Field of the Invention

The present invention relates generally to heated animal nursing devices and, more particularly, to a thermostatically controlled, heated animal nurser and means for simulating a mother's heartbeat.

2. Description of the Related Art

A great many people are involved with caring for animals across our country and the world. It is just a matter of human compassion to help care for animals that are unable to care for themselves and would die without outside assistance. Perhaps the most common animals that require help are orphaned or abandoned kittens, puppies and the like. Whether as a result of their mother dying during birth, or simply discarded because they are not wanted, these animals tug the hardest at our hearts. One of the biggest problems with such animals is getting them to feed or nurse. Any attempt by a human to feed such animals with a bottle is usually met with resistance due to the fact that the animal is not familiar with the bottle and is not comfortable.

A search of the prior art did not disclose any patents that read directly on the claims of the instant invention: however, the following references were considered related:

U.S. Pat. No. 6,042,850 describes a nursing bottle with body, flexible liner, and feeding nipple.

U.S. Pat. No. 5,699,920 describes a nurser with resilient outer shell and flexible liner.

U.S. Pat. No. 5,797,505 describes an animal nursing nipple.

U.S. Pat. No. 3,122,130 describes an automatic pig feeding apparatus.

U.S. Pat. No. 4,214,554 describes a feeding apparatus for nursing animals.

U.S. Pat. No. 4,620,505 describes an automatic self-cleansing system for nursing animals.

And, U.S. Pat. No. D394,334 describes an animal nursing feeder.

Of considerable relevance is U.S. Pat. No. 5,188,061, issued in the name of Lombardi, which describes a pet and animal feeder with nursing means within a soft material. Designed to take the place of the newborn mammal's mother in the event the mother should die, abandon its young, take ill, or any other reason, and designed not only to resemble the newborn mammal's mother but also is designed to suckle the newborn as well, the Lombardi reference also anticipates the inclusion of a heating means. While such features are incorporated into this invention in combination, other elements are different enough as to make the combination distinguished over this and other prior art.

Consequently, there is a need for a means by which abandoned or orphaned animals can be fed or nursed without the difficulties as described above.

SUMMARY OF THE INVENTION

It is therefore an object of the present invention to provide an improved heated animal nursing device.

It is a feature of the present invention to provide an improved heated animal nursing device incorporating a thermostatically controlled, heated animal nurser and means for simulating a mother's heartbeat.

Briefly described according to one embodiment of the present invention, a heated animal nurser is provided as an apparatus to aid in the feeding of orphaned infant animals such as kittens, puppies and the like. Upon initial observation of the invention, it looks like a conventional stuffed animal such as a dog or cat that a child might play with. An internal cavity that can hold up to six individual bottles, or one internal bladder having multiple nipples of milk is provided. Each bottle is provided with a nipple that protrudes through the bottom of the invention mimicking the appearance of a nursing animal mother. Additionally, an internal heating pad, powered by a battery pack is provided to keep the milk warm, thus further aiding the nursing effort of the young animals.

In accordance with a preferred embodiment, the present invention assists young animals in nursing and feeding, and can be for use with kittens, puppies, and similar animals.

An advantage of the present invention is that it mimics the look, feel and size of natural mother.

Further, the use of a stuffed animal body that is life-size and washable is supplied with internal cavity for milk bottles, or one internal bladder, that aids in properly positioning the bottles.

Further still, the use of an integrated heating pad keeps milk/formula at proper temperature.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
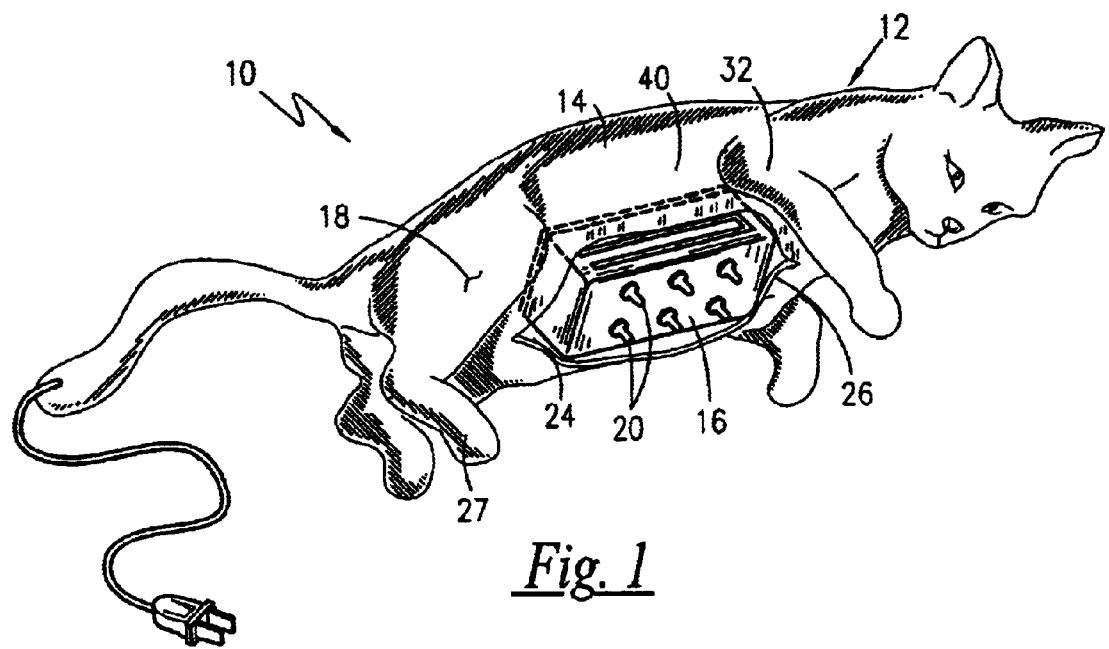
FIG. 1 is a perspective view of the present invention.
Figure 2:
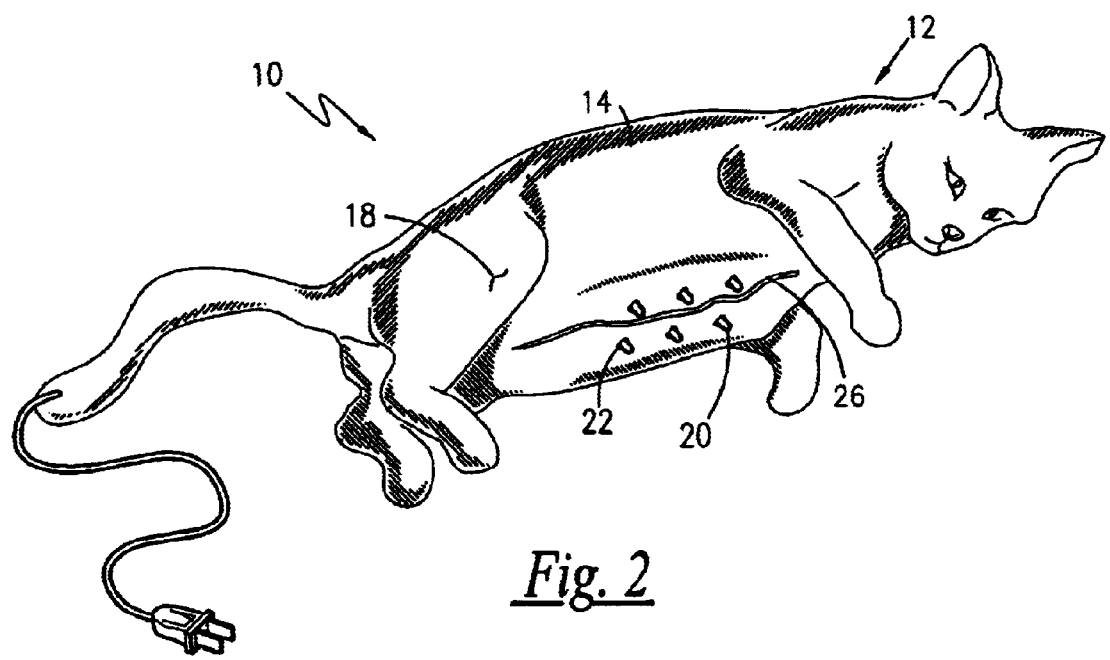
FIG. 2 is a perspective view of the nursing assembly for use therein.

Referring now to FIGS. 1–2, a heated animal nurser 10 is shown, according to the present invention, incorporating a mock animal 12 made to resemble a particular species, i.e., dog, cat, etc. is designed to take the place of the newborn mammal's mother in the event the mother should die, abandon its young, take ill, or any other reason. Designed not only to resemble the newborn mammal's mother but also is designed to suckle the newborn as well, the mock animal 12 is comprised of a stuffed cushion mother form 14 and a nursing assembly 16. The external surface 18 of the form 14 is comprised of a soft, resilient, fur-like material. The nursing assembly 16 is positioned within the form 14. The nursing assembly 16 has hollow, nippled protuberances 20 which extend through corresponding openings 22 in the form 14.

As stated above, the form 14 has the shape of the mammal mother. For exposition purposes, a cat shape is used. The form 14 has a top, bottom, two sides, front, and back. The top of the form 14 represents the mother's back. The form bottom represents the mother's underbelly. The longitudinal axis of the form is from front to back. The form 14 has an interior cavity 24. The interior cavity 24 is accessed by means of a longitudinal opening 26. The nursing assembly 16 is placed into the form cavity 24 and accessed by means of the longitudinal opening 26. The longitudinal opening 26 is closed with conventional fastener means such as snaps, hooks, laces, zipper, VECLRO, or the like. Insertable stuffing pads 32 may also be used in the interior cavity 24 about the nursing assembly 16 to further position the assembly 24.

Figure 3:
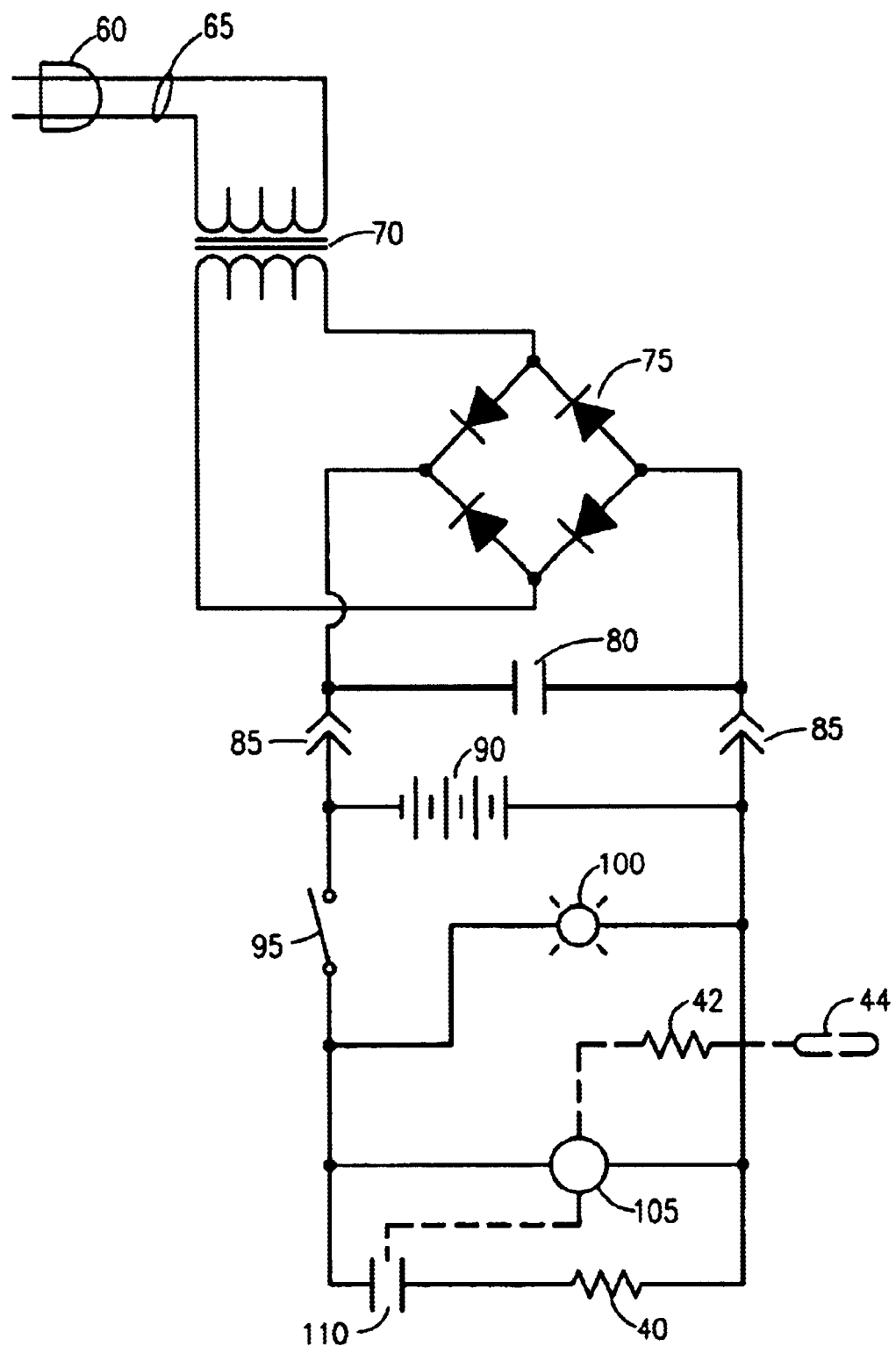
FIG. 3 is an electrical schematic of a thermal control means for use therein.
Figure 4:
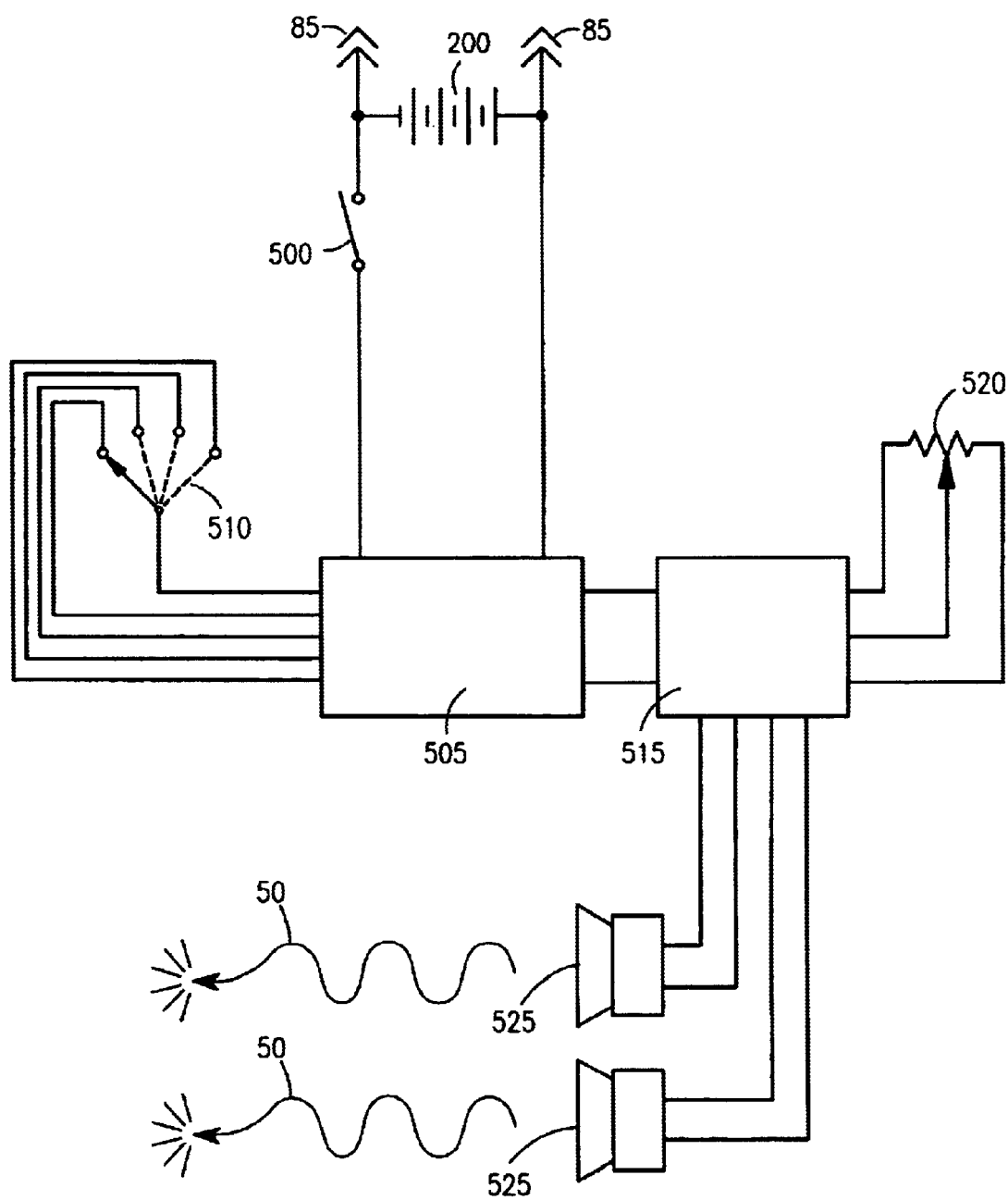
FIG. 4 is an electrical schematic

Additionally, as shown in conjunction with FIG. 3, an internal heating pad 40 is retained within the longitudinal opening 26. Alternating voltage as delivered by a conventional power plug 60 and a power cord 65 is reduced by a step-down transformer 70 and rectified into a direct current voltage by a rectifying diode bridge 75. The voltage is then filtered by a filter capacitor 80. The same stepped down, rectified, and filtered voltage is then delivered to the low voltage contacts 85. A first battery pack 90 receives said voltage through its pair of mating low voltage contacts 85 when connected. Said voltage is delivered to the first battery pack 90 for purposes of recharging. Such configuration allows use of the heated animal nurser 10 with or without an external connection to AC power. A first control switch 95 supplies said electrical power to the balance of the heating circuit. A pilot light 100 is illuminated when the first control switch 95 is closed. This visual indication of operation is envisioned to be advantageous due to the fact that normal operation of a heated appliance is not evident via visual observation alone. Power is also applied to a contactor 105 which receives its control signal from a temperature sensor 44, such as an RTD, which is adjustable by the user in its setting by use of a thermostatic control 42 which allows for the adjustable modulation of the temperature of the internal heating pad 40, through use of a contact 110 and functions to control and regulate the temperature. As can be visualized via this arrangement, the thermostatic control 42, will provide the regulation require for safe operating conditions.

Finally, incorporated nto the cavity is a means for simulating a mother's hearbeat 50. Power is received from the low voltage contacts 85, and routed to a second battery pack 200. Power from the second battery pack 200, is routed through a second control swith 500, which applies power to the remainder of the circuit when closed. Said power is applied to an electronic sound generator 505. The sounds reproduced by the electronic sound generator 505 are selected by a selector switch 510, which is a multi-position selector switch, capable of selecting particular sounds. Sound 1 may, for example, be a heartbeat of a dog, Sound 2 may be the heartbeat of a cat, Sound 3 may be the heartbeat of a pig, and so forth. The stored sounds may have been generated by digitizing authentic sounds, or they may have been synthesized, or perhaps some sounds were digitally recorded and other sounds synthesized. The various sounds are stored in the electronic sound generator 505, and are outputted as an analog signal to a stereo amplifier 515, which also receives power from the second battery pack 200. Volume of the played sounds is user adjustable and is set by a volume control 520. The actual sound is generated by stereo speakers 525 to further provide a realistic effect of a heartbeat that will vary with position of the animal feeding at the heated animal nurser 10.

The design and configuration of the second control switch 500 allows for the present invention to be easily activated by both humans and pets alike. In accordance with the present invention, a user squeezes a portion of the leg 27 thereby actuating the control circuit so sa to produce the preselected heartbeat. Typically, a pet will bite the leg 27, thereby causing compression of the second control switch 500 and in turn, actuating the present invention.

2. Operation of the Preferred Embodiment

In operation, the present invention is filled with milk. The thermostat is adjusted to the desired setting, preferably at the setting that emulates the normal body temperature of the particular species that is being fed. The audible control is set to initiate a simulated heartbeat, again as the setting that emulates the normal pulse rate of the particular species that is being fed. Provided to young animals, the present invention can function as a substitute for their natural mother.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. An infant animal nurser comprising:

a mock animal resembling the infant animal's mother and having a washable exterior surface comprising fur material, said mock animal in a reclined feeding position exposing an underbelly and allowing access to feeding nipples therein, said reclined feeding position encompassing said infant animal in a protective manner;

an interior cavity formed in said underbelly, said cavity accessible through a longitudinal opening formed along a longitudinal axis of said underbelly;

a nursing assembly retained in said cavity, said nursing assembly having a plurality of bottles corresponding to a plurality of nursing nipples, said plurality of bottles provided to control fluid exhaustion equalize servings to a plurality of infant animals;

an internal heating pad retained in said cavity posterior to said nursing assembly, said pad thermostatically controlled for warming said nursing assembly and fluid contained thereby; and means for simulating a heartbeat, said heartbeat audibly transmitted through stereo speakers placed within said mock animal;

wherein said heartbeat simulation is adapted for recognition by said infant animal.

2. The nurser of claim 1 actuated by said infant animal compressing a leg of said mock animal, wherein compression of said leg actuates a control circuit embedded therein.

* * * * *